Oct. 31, 1950 M. M. LEVY 2,527,558

TWO-WAY PULSE MULTIPLEX COMMUNICATION SYSTEM

Filed Aug. 2, 1946 3 Sheets-Sheet 1

INVENTOR
MAURICE M. LEVY
BY
Edward D. Phinney
ATTORNEY

TWO-WAY PULSE MULTIPLEX COMMUNICATION SYSTEM

Filed Aug. 2, 1946 3 Sheets-Sheet 2

INVENTOR
MAURICE M. LEVY
BY
Edward D. Phinney
ATTORNEY

INVENTOR
MAURICE M. LEVY
BY Edward [signature]
ATTORNEY

Patented Oct. 31, 1950 2,527,558

UNITED STATES PATENT OFFICE 2,527,558

TWO-WAY PULSE MULTIPLEX COMMUNICATION SYSTEM

Maurice Moïse Levy, London, England, assignor to International Standard Electric Corporation, New York, N. Y., a corporation of Delaware Application August 2, 1946, Serial No. 688,162
In Great Britain December 31, 1945

14 Claims. (Cl. 179—15)

This invention relates to multichannel electric pulse communication systems, and is concerned particularly with the problems arising from two-way systems.

In two-way pulse communication between two stations, it is necessary to provide at each station means for transmitting pulses modulated by the signals originating at that station over a communicating medium or path to the other station, and means for receiving modulated pulses arriving from the other station. The communication medium or path may be, for example, cable or open wire conductors, a carrier channel over such conductors, or a radio link. It will be assumed that the communication medium includes all necessary means for modulation or demodulation of a carrier wave or current.

In two-way pulse systems it is, of course, necessary to prevent interference between the channels conveying the signals in the two directions. One way of doing this is to employ entirely separate paths for the two directions; for example by using different conductors, or different carrier frequencies over the same conductors or over a radio link. Another way which is applicable to a pulse system operated over the same path in both directions is to divide the communication time into a number of equal periods and to transmit all the channels in one direction in one period and all the channels in the other direction in the next period, and so on.

In the arrangements of the present invention, transmitted and received single pulses are strictly alternate at each station, so that transmitted and received channel pulse trains are interleaved. Thus for a two way multichannel electric pulse communication system comprising a plurality of channel signal sources each connected to a corresponding pulse modulator, a pulse transmitter connected to all the pulse modulators, a pulse receiver connected to the same plurality of pulse demodulators each of which is connected to a corresponding signal channel, means for supplying a channel pulse to each of the modulators in turn in odd numbered periods of time, means for supplying gating pulses to each of the demodulators in turn in even numbered periods of time, and means for blocking the receiver in the odd numbered periods of time.

The invention will be explained with reference to the accompanying drawing, in which:

Figure 1 shows diagrammatically the arrangement of a two-way electric pulse communication system connecting two stations 1 and 2. In the system used for illustration at each station the communication time is divided into a number of short equal periods, and single pulses corresponding respectively to the two directions occupy alternate short periods.

Figure 1:
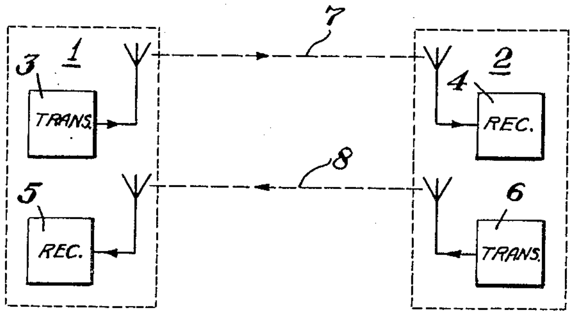
Figure 1 shows a simple block schematic diagram illustrating a two-way pulse communication system.

According to the invention, there is provided a two-way multi-channel electric pulse communication system comprising two terminal equipments connected by a communication medium, each equipment including a pulse transmitter and a pulse receiver and means for blocking and unblocking the receiver in alternate equal periods of time, the system further comprising means for synchronising the said equipments in such manner that transmitted and received pulses occur during the blocking and unblocking periods, respectively, at each equipment.

The invention also provides a two way electric pulse communication system comprising two terminal equipments connected by a communication medium, each equipment comprising a pulse transmitter, a plurality of signal sources, a distributor for determining that pulses modulated by the respective sources are transmitted successively from the said transmitter, a pulse receiver, a plurality of receiving channels, and a distributor for determining that signals carried by successive pulses received by the said receiver are distributed successively to different receiving channels; the said system further comprising means for synchronising the two equipments so that each pulse received by each of the said equipments is interleaved between two pulses transmitted by the same equipment.

The invention further provides terminal equipment in a radio system, but the principles would be the same if the pulses were transmitted over a cable, for example. At station 1 there is a transmitter 3 which transmits pulses to a receiver 4 at station 2, and also a receiver 5 adapted to receive pulses transmitted from a transmitter 6 at station 2. Elements 3 and 4, and elements 5 and 6 are shown connected by dotted lines 7 and 8 representing the communication paths between them. It will be assumed that the radio frequencies are the same for both directions, so that the paths 7 and 8 are not really separate from one another. Their electrical lengths, however, are not necessarily equal, since, for example, the two aerials at either or both stations may not be located in the same place. However, when the transmitter and receiver at both stations share a common aerial, the two paths will, of course, be equal.

In a two-way system of this kind it is necessary to synchronise the apparatus so that the following conditions are fulfilled:

(*a*) When a pulse is emitted from one of the transmitters, the adjacent receiver must be prevented from being affected thereby.

(*b*) Each receiver must be conditioned to accept a pulse when it is due to arrive from the distant transmitter, and to direct the pulse into the corresponding demodulating channel.

In two-way pulse communication systems employing different radio frequencies or different cables for the two directions, condition (*a*) does not arise, and condition (*b*) can be independently fulfilled for the two directions, generally by the use of synchronising pulses which are distinguishable from the channel pulses, since the arrangement is really two entirely separate one-way systems. When as in the case of the present invention the transmitted and received pulses occur in alternate periods of time at each station the simultaneous fulfilment of conditions (*a*) and (*b*) for both directions of transmission imposes special requirements on the equipment, which will be understood from the following explanation. It will be assumed that there are a total of $n/2$ complete two-way channels between the two stations, or in other words there are a total of $n$ one-way channels in the system to deal with both directions of communication, and to each of these one-way channels corresponds a train of channel pulses. One of these trains of channel pulses is set apart for synchronising the two stations.

According to the invention, it is arranged so that at each station, the communication time is divided into a number of equal short pulse periods, and that every transmitted pulse occurs in a pulse period between two received pulses, and every received pulse occurs in a pulse period between two transmitted pulses. Thus at each station, transmitted and received pulses must appear alternately. Although the pulse periods at both stations are necessarily equal, they do not necessarily coincide, but in certain circumstances, they do coincide.

The factors which affect the above-stated conditions (*a*) and (*b*) are the frequency of repetition of the pulses in the channel pulse trains, and the electrical path lengths between the two stations in the two directions. Either or both of these factors might be suitably adjusted, but as will appear later, according to the present invention, arrangements are provided by which the frequency of repetition is adjusted.

The above considerations will be explained with reference to Figure 2. In this explanation the following symbols will be used:

$n$=the total number of one-way channels in the system.

T=the repetition period of each channel pulse train.

$p$=the pulse period=$T/n$.

$t_1$=the time of transmission of the pulses from station 1 to station 2.

$t_2$=the time of transmission of the pulses from station 2 to station 1.

Figure 2:
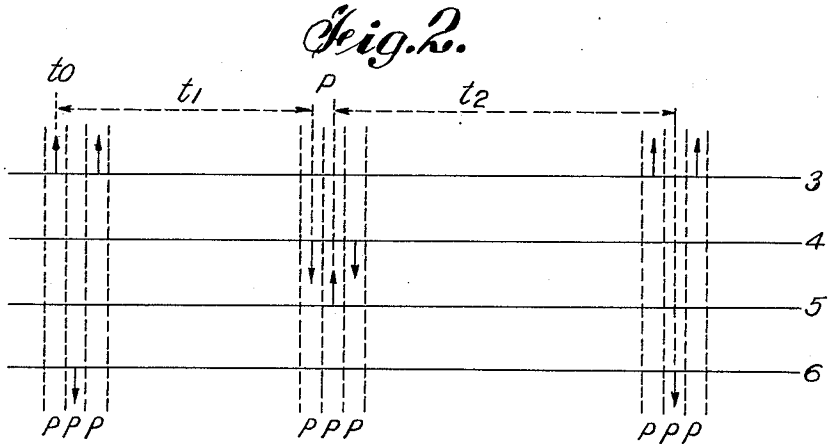
Figure 2 shows a diagram used to explain the interleaving principles of the invention.

In Figure 2 the lines marked 3 to 6 represent time scales corresponding to the four similarly numbered elements in Figure 1. It will be first assumed that the pulses are unmodulated and that each is to occur at the centre of a corresponding pulse period $p$. The pulses are represented by arrows in Figure 2 which are turned up for transmitted pulses and turned down for received pulses. Let a pulse be transmitted at time $t_0$ from the transmitter 3, at the centre of the corresponding pulse period $p$. This pulse travels to the station 2 and is received by the receiver 4 after a time $t_1$ which is not necessarily an exact multiple of $p$, but which defines the centre of a pulse period $p$ for the station 2. It is necessary to arrange so that the transmitter 6 transmits a pulse in the middle of the next pulse period $p$ which pulse is received by the receiver 5 after a time $t_2$, and this received pulse must arrive at the centre of a pulse period $p$ between two transmitted pulse periods. It will be evident from Figure 2 that $t_1+t_2+p$ must be equal to an odd number of pulse period $p$, or $$t_1+t_2+p=(2N+1)p$$

where N is any integer, or $$t_1+t_2=2NT/n \qquad (1)$$

It is to be noted that $t_1$ and $t_2$ are not necessarily equal, since for example, the aerials corresponding to the two directions of transmission may not be spaced apart by the same distance. However if $t_1$ and $t_2$ are both equal to $t$, then Equation 1 reduces to $$t=NT/n \qquad (2)$$

In this case the time of transmission $t$ must be equal to an integral number of pulse periods $p$, and the pulse periods at the time stations will coincide.

It will be evident that Equation 1 or 2 may be satisfied either by adjusting T, or by adjusting $t_1$, $t_2$ or $t$, or possibly by both means. The method chosen for the present invention is the first of these, and it will be shown that the necessary adjustment of T is small unless the two stations are very close together.

It is, however, not sufficient merely to change the repetition frequency of the pulses. A change in T will normally require corresponding changes in the pulse distribution arrangements at the two stations, and the equipment provided at these stations must be capable of being adjusted to fulfil the conditions explained above when the locations of the stations have been settled.

Equation 2 above may be rewritten as follows:

$$T=nt/N$$

Thus $$\frac{dT}{dN}=-nt/N^2$$

or $$\frac{dT}{T}=-\frac{dN}{N}$$

It is, however, only of interest to know what is the change in T which corresponds to one pulse period $p$. In this case $dN=1$ so that $$dT/T=-1/N$$

In order to indicate what this involves, a numerical example will be taken for a 10 channel two-way pulse system ($n=20$) in which T is taken nominally as 100 microseconds. The pulse period $p$ is then equal to 5 microseconds. Since $t$ is the time of transmission from one station to the other, the corresponding distance D in kilometres will be $0.3t$, where $t$ is measured in microseconds, taking the velocity of propagation as $3\times10^5$ km. per second. D is also equal to $0.3NT/n=1.5N$ km.

The following table gives the relation between N, D and $dt$/T, the latter being expressed as a percentage for the above stated condition

| N | 1 | 2 | 3 | 5 | 10 | 15 | 20 | 30 | 40 | 50 |
|---|---|---|---|---|---|---|---|---|---|---|
| D (km.) | 1.5 | 3 | 4.5 | 7.5 | 15 | 22.5 | 30 | 45 | 60 | 75 |
| $d$T/T% | 100 | 50 | 33 | 20 | 10 | 7.5 | 5 | 3.3 | 2.5 | 2 |

It is clear that when the stations are near together (say less than about 15 km.) it may be impracticable to adjust T because the change necessary is likely to be so large.

Although the pulses have been assumed to be unmodulated in order to make the explanation clear, it will be evident that there will be no interference between the channels of the two directions so long as the modulation does not shift any pulse beyond the boundaries of its corresponding pulse period $p$.

Figure 3:
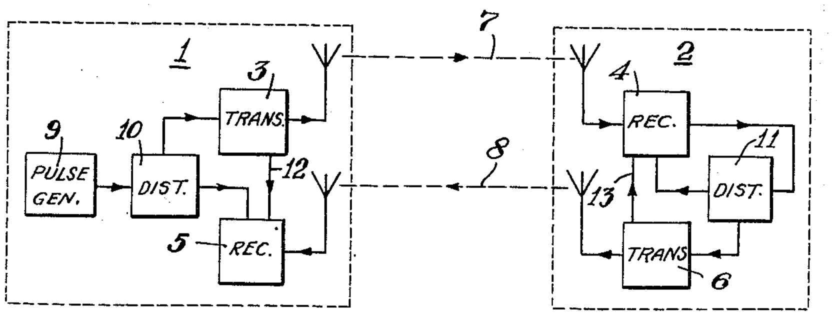
Figure 3 shows a block schematic circuit diagram of a preferred arrangement according to the invention.

Figure 3 shows one arrangement according to the invention in which the special conditions explained above may be satisfied. The elements 1 to 8 are the same as those similarly numbered in Figure 1. At station 1 there is provided a master pulse generator 9 which generates a train of pulses having the nominal repetition period T desired for each channel pulse train, but the period T should be adjustable over a small range. The generator 9 supplies the pulses to a distributor 10 of any suitable type which is common to the transmitter 3 and receiver 5. This distributor supplies trains of channel pulses (in the odd numbered pulse periods $p$, for example) over conductors individual to the pulse trains to the transmitter 3 for modulation by the respective channel signals in known manner; and it also supplies gating pulses over individual conductors in the even numbered periods $p$ to the receiver 5. In Figure 3, the individual conductors connecting the distributor 10 to the transmitter 3 and to the receiver 5 are not shown separately in order to avoid complicating the diagram.

It will be understood that one of the trains of channel pulses emitted by the transmitter 3 will be used for synchronising the station 2 with the station 1, and for this purpose the pulses will be given some distinguishing characteristic by which they can be recognised as synchronising pulses by the receiver 4, according to known practice.

The transmitter 4 and receiver 6 at station 2 are provided with a common distributor 11 to the input of which are applied the synchronising pulses selected by the receiver 4, or pulses derived from the synchronising pulses. This distributor should be designed to supply gating pulses over individual conductors to the receiver 4 at the times when pulses are due to be received from the transmitter 1. The distributor 11 should also supply channel pulses over individual conductors for modulation by the transmitter 6. These channel pulses are derived from the received synchronising pulses which at station 2 correspond to the master pulses from the generator 9 at station 1.

It is necessary also to ensure that the pulses which are emitted from the transmitters are prevented from passing through the adjacent receivers. This is best arranged according to well known practice by applying pulses from each transmitter directly to the adjacent receiver, during the corresponding transmitting pulse periods, as indicated by the conductors 12 and 13.

Figure 4:
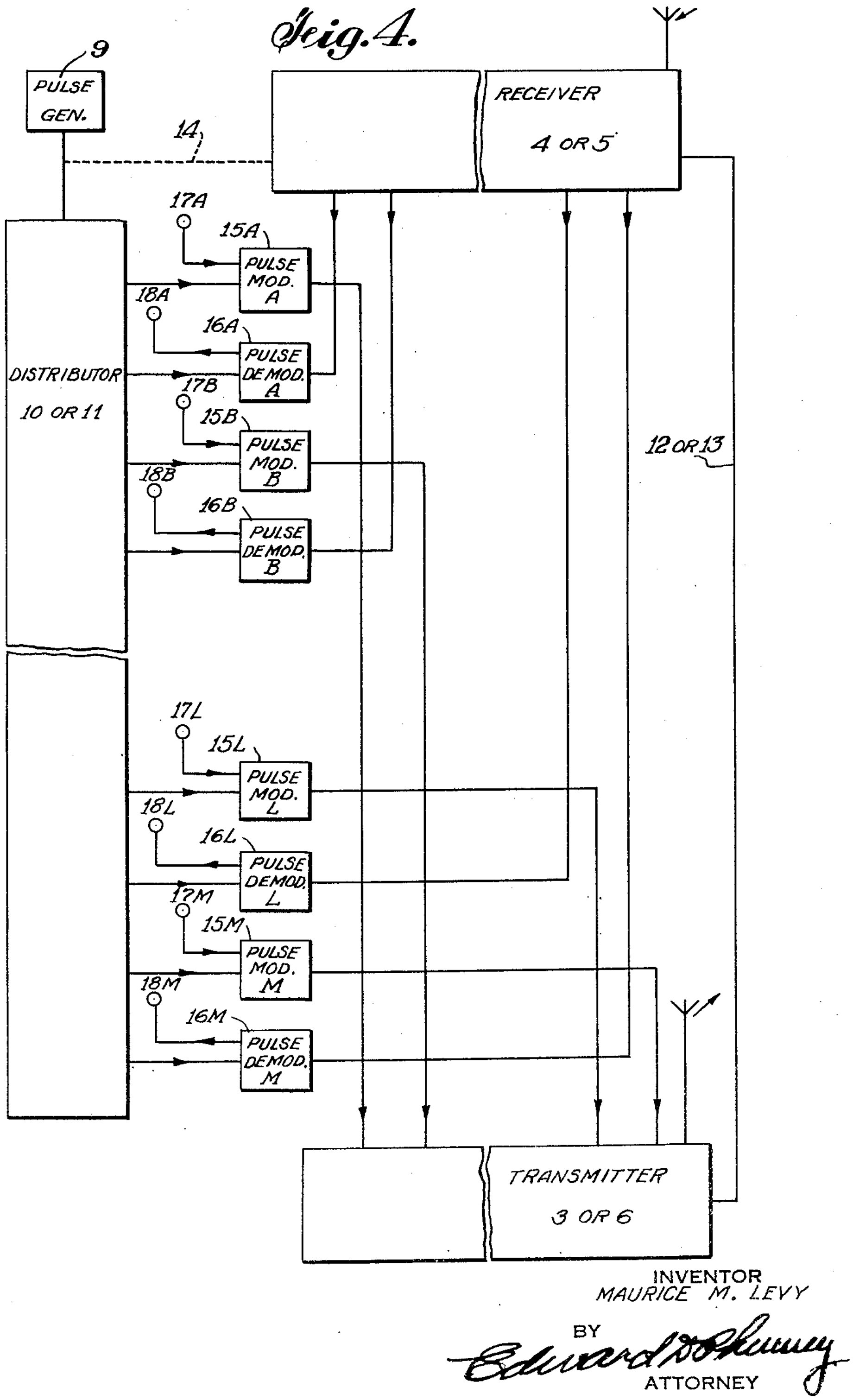
Figure 4 shows fuller details of the terminating equipment of Figure 3.

Figure 4 shows in slightly more detail the arrangements at each of the terminal stations 1 and 2. As already explained, the only difference between the two stations is that at station 2, the pulse generator 9 is omitted, the corresponding pulses being supplied from the receiver 4 to the distributor 11 over a conductor 14 shown dotted in Figure 4.

A plurality of pulse modulators are arranged in a series alternately with a plurality of pulse demodulators. Only the first two of each corresponding to channels A and B and the last two corresponding to channels L and M are shown, the pulse modulators being designated 15A, 15B, 15L, 15M, and the pulse demodulators being designated 16A, 16B, 16L, 16M, respectively. It will be understood that there can be any number of additional modulators and demodulators (not shown) arranged between those which have been shown.

The distributor 10 or 11 supplies pulses in turn to the modulators and demodulators in the alternate periods $p$, as explained with reference to Figure 3. The outputs of the modulators 15 are connected in order to the transmitter 3 or 6 where the various trains of modulated channel pulses are combined and are applied to modulate a carrier wave according to the usual practice, or are otherwise transmitted over the communication medium. The modulating signals are applied at the input terminals 17A, 17B etc. of the respective modulators.

The inputs of the demodulators 16 are likewise connected in order to the receiver 4 or 5 in which the incoming carrier wave (if any) is demodulated in the usual way to produce the combined modulated trains of channel pulses. Each demodulator 16 picks out the corresponding channel pulse train with the help of the gating pulses obtained from the distributor 10 or 11, and the demodulated signals are obtained from the corresponding output terminals 18A, 18B etc. As already explained, also, the transmitter 3 or 6 supplies appropriate blocking pulses over conductor 12 or 13 to the associated receiver 4 or 5 during the period $p$ when pulses are being transmitted.

It will be understood that the pulse modulators and demodulators 16 and 17 may take any of a number of forms well known to those skilled in the art which it is not necessary to describe, since the particular form chosen is immaterial for the purpose of the present invention. Examples of pulse modulators and demodulators which could be used are however given in British Patent No. 596,658 of P. K. Chatterjea for "Triple Pulse Synchronizing System" issued April 8, 1948. The transmitter 3 or 6 and the receiver 4 or 5 may also be of any suitable type.

Figure 5:
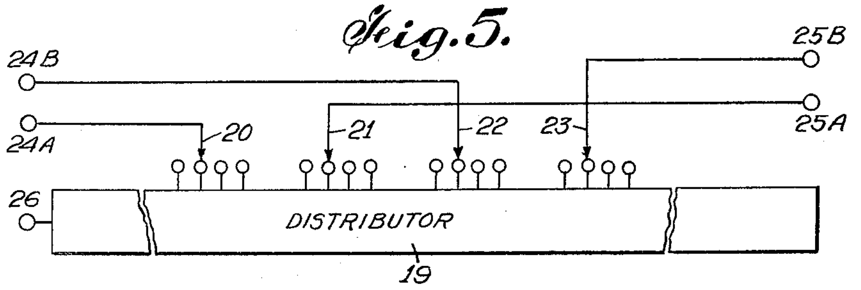
Figure 5 shows one form of the pulse distributors of Figure 3 or 4 capable of adjustment to obtain the required interleaving of the channel pulses corresponding to the two directions.

The distributors 10 and 11 are preferably identical and one suitable form is shown diagrammatically in Figure 5. Each distributor may comprise a delay network in the form, for example, of a number of series inductances and shunt condensers forming a number of sections, such for example, as is described in British Patent No. 587,939 of M. M. Levy for "Delay Network for Defining Channel Width" issued August 7, 1947. In order to make the matter clear it will be assumed that the system has 10 two-way channels ($n=20$) and that the repetition period T is nominally 100 microseconds but is adjustable between the limits 90 and 100 microseconds. It will be assumed also that adjustment of the interleaving of the channels should be possible to within 10% of a pulse period. The pulse period being 5 microseconds, this means that adjustment to within 0.5 microsecond is required.

The delay network could accordingly consist of 200 sections each introducing a delay of 0.5 microsecond, with a tapping available at each section. A switch is required having 19 banks of contacts which for convenience will be considered as numbered from 2 to 10 inclusive, to correspond with the similarly numbered channels. Bank No. 1 which would correspond with the first channel to which the synchronising pulses are allotted is not required. In each bank a movable brush member can be adjusted to make contact with any one of the contacts of the bank which are connected respectively to appropriate tappings of the delay network. All the brush members are mechanically connected so as to be simultaneously adjusted. Figure 5 shows parts of four of these banks connected to the delay network 19 to indicate the arrangement, the brush members being shown at 20, 21, 22 and 23. The other fifteen banks are not shown, but will be arranged in order along the network in a similar manner. The brushes 20, 21, 22, 23, etc. are each connected to a corresponding terminal 24A, 24B, 25A, 25B, etc. The input terminal of the network is 26.

Now it will be evident that when the period T of the generator 9 is adjusted in order to satisfy Equation 1 or 2, the pulse period $p$ is changed, and therefore the separation of the tappings on the delay network corresponding to adjacent channels must be changed also. Assuming that channel No. 1 is allotted to the synchronising signals, the time of reception of the pulses corresponding to the twentieth channel with respect to the synchronising pulses may need to be adjusted by an amount which may be nearly as much as 10 microseconds, so that the twentieth bank of the switch must have 20 contacts connected respectively to the last 20 tappings of the delay network. The necessary range of adjustment of the times of the pulses corresponding to the other channels will be progressively less as the order number of the channel decreases, no adjustment at all being required for the first channel, which is assumed to be the one used for the synchronising pulses. Thus while all the banks of the switch will need to have 20 positions, several of the contacts in each bank (except the twentieth bank) may be connected to the same tapping of the network, a change being made only when the interleaving error would otherwise exceed 0.5 microsecond.

At both stations, the even numbered brush terminals 24A, 24B, etc. of the network 19 will be connected by individual conductors to the transmitters (3 or 6), as shown in Figure 4 and the odd numbered brush terminals 25A, 25B etc. will be connected by individual conductors to the receivers (4 or 5). At station 1, terminal 26 of the network will be connected to the master pulse generator 9, while at station 2, this terminal will be connected to a point at the output of the receiver 4 over conductor 14 (Figure 4) from which only the synchronising pulses (or pulses derived from them) are obtained.

The interleaving adjustment is made by means of the synchronising pulses, the times of transmission of which from the station 2 are not affected by the adjustment of the distributor 11 at that station. The frequency of the generator 9 and the distributor 10, are adjusted until the synchronising pulses are received back at the station 1 on the receiver 5 correctly interleaved with the other pulses sent out by the transmitter 3. Then the distributor 11 is adjusted until the pulses of the twentieth channel are received at station 1 correctly interleaved.

Figure 6:
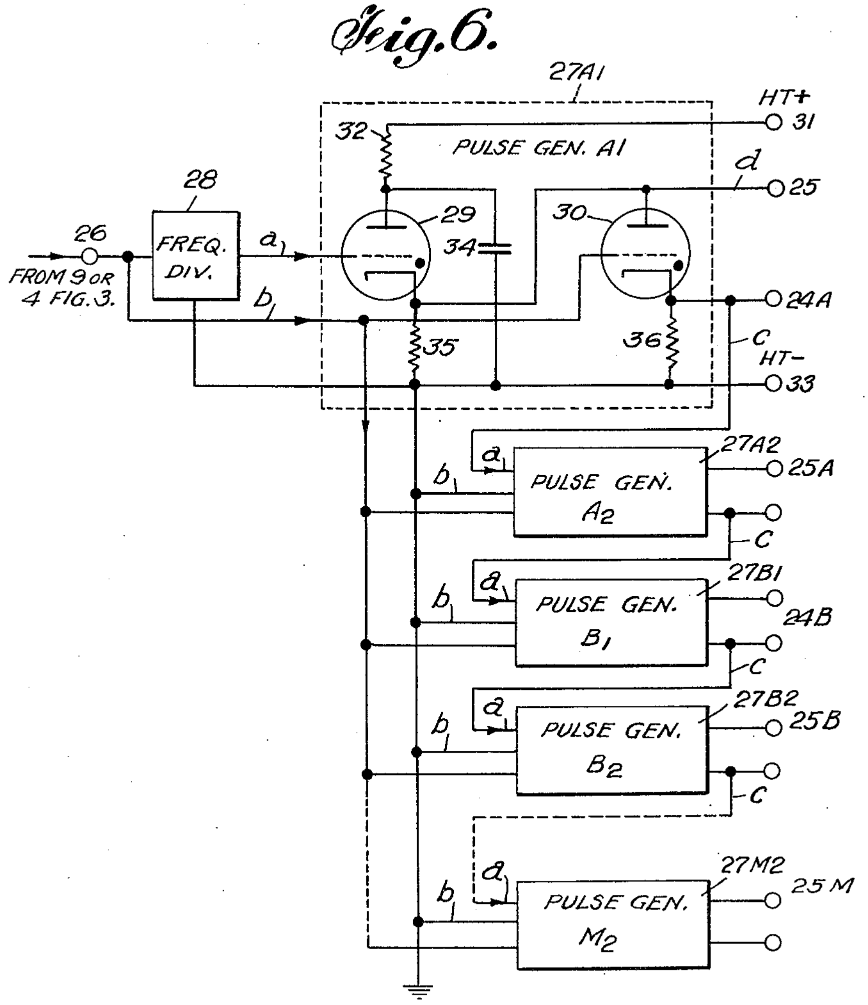
Figure 6 shows another form of pulse distributor.

Another type of distributor is shown in Figure 6, and is more convenient than that shown in Figure 5. No mechanical adjustments are required when the pulse repetition frequency is changed in order to satisfy the interleaving requirements. This distributor is one of those described in British Patent No. 596,699 of C. W. Earp for "Arrangements for Generating Electric Pulses" issued April 8, 1948.

The distributor comprises $n$ pulse generators, all of which are exactly alike. Five only of these are shown and are designated 27A1, 27A2, 27B1, 27B2 and 27M2, which is the last one. The details of the first generator 27A1 only are shown.

In this case, a train of short pulses of repetition frequency $n$ must be supplied to terminal 26 from the master pulse generator 9 or from the receiver 4 of Figure 3. These are supplied to each of the pulse generators 27 of Figure 5 and also to a frequency divider 28, which generates a train of short pulses having the repetition period T desired for each train of channel pulses. This frequency divider may be of any well known type.

As will be made clear later, the 1st, 3rd, 5th and other odd-numbered pulse generators 27 supply the channel pulses to the transmitter 3 or 6 and the 2nd, 4th, 6th and other even-numbered pulse generators 27 supply the gating pulses to the receiver 4 or 5.

The pulse generator 27A1 employs two grid-controlled gas-filled tubes 29 and 30. The anode of the first tube 29 is connected to the positive high tension terminal 31 through a resistance 32 and to a ground terminal 33 (which is also the negative high tension terminal) through a condenser 34. The cathode of this tube is connected through a resistance 35 to ground, and also directly to the anode of the tube 30, the cathode of which is grounded through a resistance 36 which has a smaller value than the resistance 35. Input conductors $a$ and $b$ are connected respectively to the control grids of the tubes 29 and 30, and output conductors $c$ and $d$ are connected respectively to the cathode and anode of tube 30.

Conductors $a$ and $b$ are connected respectively to the output of the frequency divider 28 and directly to the input terminal 26, while output terminals 24A and 25 are respectively connected to the cathode and anode of tube 30. Terminal 25 is not used in the odd-numbered pulse generators, but corresponding terminals 25A, 25B etc, are used in the even numbered pulse generators. Likewise terminals 24A, 24B, etc. are used only in the odd-numbered pulse generators.

In the initial condition, both tubes should be extinguished so that there will be no potential on either of the conductors *c* or *d*, and the condenser 34 will be charged up to the potential of the high tension source.

The frequency divider 28 should be arranged to supply a positive starting pulse over conductor *a* to the control grid of the tube 29, which fires this tube, thereby discharging the condenser 29 through the resistance 35. The value of the resistance 35 should be chosen so that the time constant of the discharge circuit for the condenser 34 is large compared with the period $1/n$. Preferably the condenser should not lose more than 10% of its charge during this period.

The voltage drop in the resistance 35 is applied to the anode of the tube 30, and this tube is fired by the next following pulse received over the conductor *b* from the master pulse generator 9. The firing of this tube effectively connects the resistance 31 in shunt with the resistance 35, and resistance 36 should be small enough rapidly to discharge the condenser 34. When this occurs, the voltage of the anode of the tube 29 is reduced practically to zero so that the tube will be extinguished, and the consequent disappearance of the current in the resistance 35 extinguishes the tube 30 also. It will be seen that a nearly rectangular gating pulse of voltage will be generated across the resistance 35, having a duration $1/n$. This pulse is obtained from terminal 25. A short positive pulse coinciding with the trailing edge of the rectangular pulse will be generated across the resistance 36, and this is applied over conductors *c* and *b* to the control grid of the valve 29 in the next generator. All the other generators operate in the same way, the operation of each being started by the positive pulse from the preceding generator, and terminated by the next following pulse from the master generator 9.

Terminals 24, 24B . . . 24M of the odd-numbered pulse generators of Figure 6 are connected by separate conductors to the transmitter 3 or 6 of Figure 4, as already explained with reference to Figure 5, and provide the short channel pulses for modulation in these transmitters. Terminals 25A, 25B . . . 25M of the even-numbered pulse generators of Figure 6 are likewise connected by separate conductors to the receiver 4 or 5 of Figure 4 and supply the necessary gating pulses in the alternate periods *p*.

The master pulse generator 9 could for example comprise an oscillation generator of frequency *n* supplying waves to an amplitude limiter which is adapted to be overloaded to produce substantially rectangular waves in the well known way. The desired short pulses for application to terminal 26 could be obtained by differentiation, all the pulses of one sign being removed by suitable means, according to well known practice. It will be understood that the frequency *n* of the oscillator may be adjusted in order to satisfy the interleaving requirements without affecting the factor of subdivision by the divider 28 provided the frequency change is small (and it will generally be small as already pointed out), since the frequency divider can be designed along well known lines to have a fair margin of operation without jumping to another factor. Thus the interleaving adjustment can be made without any other change, since the duration of the gating pulses and the spacing of the short starting pulses generated by the pulse generators are determined by the pulses produced by the master generator. Thus the rather complicated mechanical switching required for a distributor of the type shown in Figure 5 is avoided.

The specification referred to above gives some other circuits for the pulse generators shown in Figure 6 which could also be used in the present invention, if desired.

The arrangements of Figures 3, 4, 5 and 6 have been given to illustrate one method of carrying out the principles of the invention. Details of the arrangements for modulating or demodulating the pulses have not been given since these arrangements may be provided in any suitable known way. Likewise the gating and blocking arrangements are not explained, since suitable circuits can be provided by those skilled in the art. It will be understood, of course, that either time-phase or time-duration modulation of the channel pulses may be employed.

It will be evident also that the principles of the invention, which have been fully explained, may be carried out in other ways than that which has been described with reference to Figures 3, 4, 5, and 6.

What is claimed is:

1. Terminal equipment for a two way multi-channel electric pulse communication system comprising a plurality of modulators and demodulators, a plurality of channel signal sources each connected to a corresponding pulse modulator, a pulse transmitter connected to all the pulse modulators, a pulse receiver connected to the same plurality of pulse demodulators each of which is connected to a corresponding signal channel, means for supplying a channel pulse to each of the modulators in turn in odd numbered periods of time, means for supplying gating pulses to each of the demodulators in turn in even numbered periods of time, and means for blocking the receiver in the odd numbered periods of time.

2. A two way electric pulse communication system comprising two terminal equipments connected by a communication medium, each equipment comprising a pulse transmitter, a plurality of signal sources, a distributor for determining that pulses modulated by the respective sources are transmitted successively from the said transmitter, a pulse receiver, a plurality of receiving channels, and a distributor for determining that signals carried by successive pulses received by the said receiver are distributed successively to different receiving channels; the said system further comprising means for synchronising the two equipments so that each pulse received by each of the said equipments is interleaved between two pulses transmitted by the same equipment.

3. A two way multi-channel electric pulse communication system comprising two terminal equipments connected by a communication medium, each equipment including a pulse transmitter and a pulse receiver and means for blocking and unblocking the receiver in alternate equal periods of time, the system further comprising means for synchronising the said equipments in such manner that transmitted and received pulses occur during the blocking and unblocking periods, respectively, at each equipment.

4. A two way multi-channel electric pulse communication system comprising two terminal equipments connected by a communication medium, each equipment comprising a transmitter and a receiver, a distributor adapted to synchronise both a pulse transmitter and a pulse receiver in such manner that in odd numbered periods of time pulses are transmitted over the medium from the transmitter, the receiver being blocked, and in even numbered periods of time the receiver is unblocked, and means for adjusting the timing of the transmitted pulses in such manner that pulses arrive at each receiver during the periods when it is unblocked.

5. Equipment according to claim 1 in which the means for supplying the channel and gating pulses comprises a distributor common to the said transmitter and receiver.

6. A system according to claim 2 in which a single distributor common to the transmitter and receiver serves the purpose of both the said distributors.

7. A system or equipment according to claim 2 in which each of the said distributors comprises a tapped delay network.

8. A system or equipment according to claim 4 in which at least one of the equipments of the system includes a master pulse generator connected to the input of a corresponding delay network coupled to a pulse transmitter and a pulse receiver.

9. A system or equipment according to claim 2 in which the distributor for determining that signals carried by successive pulses received by the said receiver are distributed successively to different receiving channels comprises a delay network, the input of the delay network connected to the output of the receiver thereof, and the outputs of said network being connected to said receiving channels.

10. A system or equipment according to claim 2 in which the distributors in at least one of said equipments comprises a delay network and in which transmitted pulses for each channel and gating pulses for each receiver are derived from corresponding tappings on the delay network.

11. A system or equipment according to claim 4 in which at least one of the equipments of the station includes a master pulse generator connected to the input of a corresponding tapped delay network coupled to a pulse transmitter and a pulse receiver and in which the pulse generator is provided with means for adjusting the repetition frequency of the pulses generated thereby, and in which each delay network is provided with means for changing the tapping point from which any train of transmitted or gating pulses is derived.

12. A two way multi-channel electric pulse communication system comprising at least two terminal equipments connected by a communication medium, a pulse transmitter and pulse receiver in each of said terminal equipments, a distributor in each of said equipments comprising a plurality of pulse generators arranged in a series each of which is adapted to generate a train of rectangular pulses and a train of short pulses of the same repetition period, and means for applying the short pulses of the odd-numbered pulse generators as channel pulses for modulation in the pulse transmitter, and the rectangular pulses of the even-numbered pulse generators as gating pulses to the pulse receiver, said means being adjustable such that pulses are transmitted by said transmitter and received by said receiver during alternate time intervals.

13. A system according to claim 12 comprising means for generating a train of short terminating pulses having a repetition period equal to each of the said repetition period of said short pulses, means for deriving from the said terminating pulses a train of short starting pulses having the repetition period desired for each channel pulse train, means for applying the starting pulses to start the operation of the first generator of the series, means for applying the train of short pulses generated by each generator except the last to start the operation of the next following generator in the series, and means for applying the terminating pulses to terminate the operation of each pulse generator in turn.

14. A system or equipment according to claim 12 in which each of said pulse generators includes two grid-controlled gas-filled tubes.

MAURICE MOÏSE LEVY.

REFERENCES CITED

The following references are of record in the file of this patent:

UNITED STATES PATENTS

| Number | Name | Date |
|---|---|---|
| 2,006,812 | Nicolson | July 2, 1935 |
| 2,199,634 | Koch | May 7, 1940 |
| 2,262,838 | Deloraine et al. | Nov. 18, 1941 |
| 2,308,381 | Mertz | Jan. 12, 1943 |
| 2,395,467 | Deloraine | Feb. 26, 1946 |
| 2,406,165 | Schroeder | Aug. 20, 1946 |